(12) United States Patent
Darling et al.

(10) Patent No.: US 7,296,268 B2
(45) Date of Patent: Nov. 13, 2007

(54) DYNAMIC MONITOR AND CONTROLLER OF AVAILABILITY OF A LOAD-BALANCING CLUSTER

(75) Inventors: Christopher L. Darling, Sammamish, WA (US); Michael E. Gernaey, Lapeer, MI (US); Hallvard S. Kaldestad, Carnation, WA (US); Howard A. Aikins, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 09/740,720

(22) Filed: Dec. 18, 2000

(65) Prior Publication Data

US 2002/0078263 A1 Jun. 20, 2002

(51) Int. Cl.
*G06F 9/46* (2006.01)
(52) U.S. Cl. .................. 718/105; 718/106; 709/230
(58) Field of Classification Search ............ 718/105, 718/106; 709/230
See application file for complete search history.

(56) References Cited

U.S. PATENT DOCUMENTS

| | | | |
|---|---|---|---|
| 5,799,173 A * | 8/1998 | Gossler et al. .............. 703/21 |
| 6,321,263 B1 * | 11/2001 | Luzzi et al. ................ 709/224 |
| 6,324,580 B1 * | 11/2001 | Jindal et al. ............... 709/228 |
| 6,463,454 B1 * | 10/2002 | Lumelsky et al. .......... 718/105 |
| 6,606,643 B1 * | 8/2003 | Emens et al. .............. 709/203 |
| 6,691,165 B1 * | 2/2004 | Bruck et al. ............... 709/227 |
| 6,711,557 B1 * | 3/2004 | Palaniappan ................ 706/45 |
| 6,711,607 B1 * | 3/2004 | Goyal ....................... 709/203 |
| 6,728,748 B1 * | 4/2004 | Mangipudi et al. ......... 718/105 |
| 6,898,793 B1 * | 5/2005 | Yamamoto et al. ......... 719/317 |
| 7,124,188 B2 * | 10/2006 | Mangipudi et al. ......... 709/226 |

* cited by examiner

*Primary Examiner*—William Thomson
*Assistant Examiner*—Andy Ho
(74) *Attorney, Agent, or Firm*—Lee & Hayes, PLLC (57) ABSTRACT

An implementation of a technology, described herein, for remotely and dynamically monitoring the availability of the members of a load-balancing cluster. An implementation of the claimed invention includes a dynamic, exocluster application-layer monitor for dynamically monitoring and dynamically controlling the members of a load-balancing cluster. It may actively control the members that it monitors. The exocluster monitor is protocol agnostic. It dynamically adjusts so that it can monitor all of the members of the cluster as members are added and removed. This abstract itself is not intended to limit the scope of this patent. The scope of the present invention is pointed out in the appending claims.

55 Claims, 4 Drawing Sheets

Fig. 1
Background

DYNAMIC MONITOR AND CONTROLLER OF AVAILABILITY OF A LOAD-BALANCING CLUSTER

TECHNICAL FIELD

This invention generally relates to a technology for remotely and dynamically monitoring the availability of the members of a load-balancing cluster. This invention further generally relates to a technology for remotely and dynamically controlling the availability of the members of a load-balancing cluster.

BACKGROUND

During the early days of the blossoming of the World Wide Web manifestation of the Internet, there was a one-to-one relationship between Web site and computer. For each Web site, there was a single computer (generally called a "Web server") that hosted the Web site. The Web site had a single address (called an IP address) and that address was associated with the site's single computer.

The popularity of the Internet has become ubiquitous. Web sites are big business. For many Web sites, a single computer does not serve the volumes of activity that currently takes place and certainly cannot scale to handle the volumes to come. To accommodate these needs, the concept of "load-balancing clusters" was introduced.

Clustering

Clustering is the connecting of two or more computers together in such a way that they behave like a single computer. Clustering is used for parallel processing, for load balancing, and for fault tolerance.

In general, the goal of a cluster is to make it possible to share a computing load over several systems without either the users or system administrators needing to know that more than one system is involved. If any component in the system, hardware or software fails, the user may see degraded performance, but will not lose access to the service. Ideally, if more processing power is needed, the system administrator simply "plugs in a new component", and presto, the performance of the clustered system as a whole improves.

Load Balancing

As the name implies, "load balancing" attempts to evenly distribute workload amongst several computers. For Web sites, load balancing helps solve the "server-busy" problem that arises when servers drown from a flash flood of users hitting them. Load balancing prevents the problem by keeping track of which server in a group of servers user requests have been routed to and knowing roughly how busy each server is. By approximating that, load balancing determines where to direct the next request.

For example, a company can devote a Web site to the sporting event that it sponsors and use load balancing to handle the crush of hits during the event. Companies find load balancing useful because it is an intelligent and affordable method for apportioning high volumes of requests for server access across multiple machines, be they on the Web or in a data center.

With this technology, server failures are simpler to mask, reducing downtime for the end-user. Previously, managing server failures meant taking hosts out of DNS (Domain Name System) or rebooting them immediately. With load balancing, the failing server can be left in the failed mode for debugging without impacting end-user availability.

Conventional Load-Balancing Clusters

Figure 1:
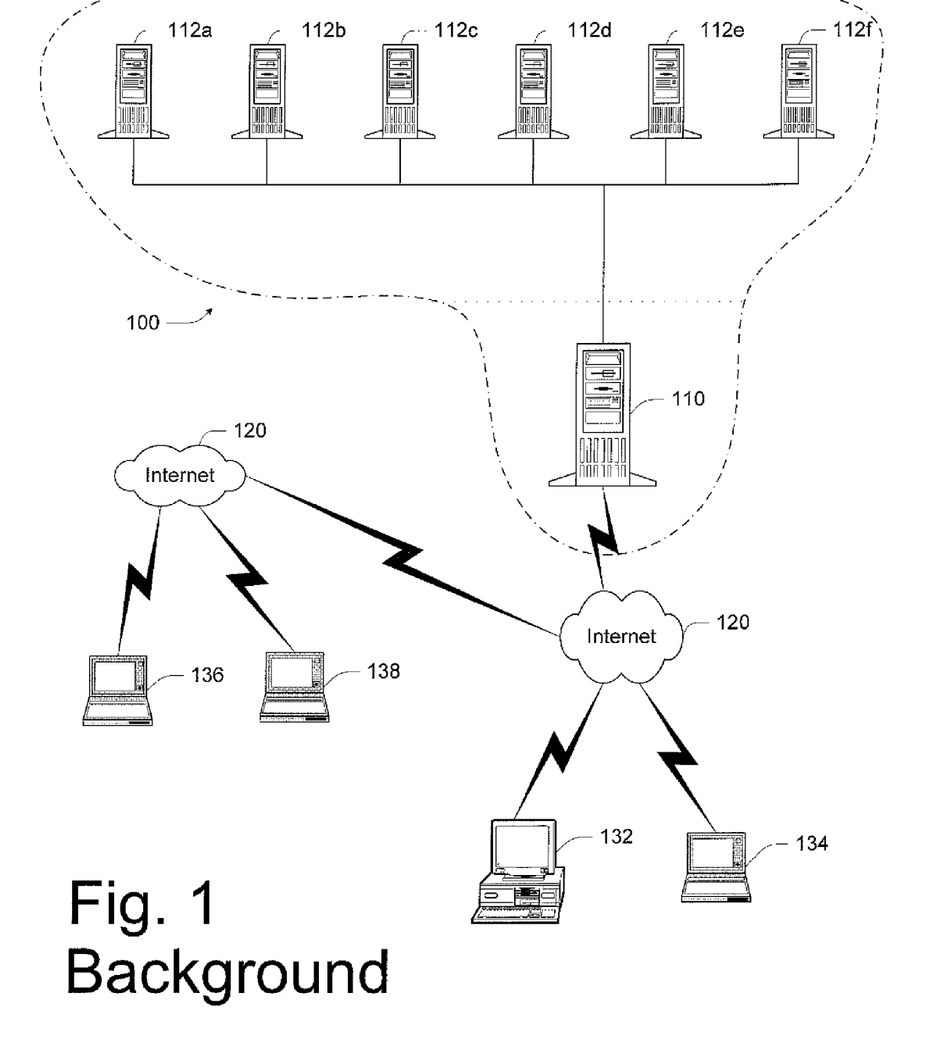
FIG. 1 is a schematic diagram showing a network environment (including a cluster) within which an implementation of the invention claimed herein may be so implemented.

FIG. 1 illustrates a conventional load-balancing cluster 100, which consists of cluster nodes 112a-f. Typically, node 112a-f are nearly identical. Members of a cluster are referred to as nodes or servers. These terms are used interchangeably, herein.

In this conventional load-balancing cluster 100, a node manager 110 serves as the gatekeeper and the proxy for the nodes of the cluster. In the case of a Web site, the node manager 110 hosts the single IP address for the Web site, but it directs users to any one of the nodes 112a-f for service. Other conventional load-balancing clusters employ a partially or fully distributed scheme for managing load-balancing. An example of a fully distributed architecture is the Microsoft® Network Load-Balancing (NLB) cluster architecture. Those of ordinary skill in the art understand the existing architectures of load-balancing schemes.

Typically, the load-balancing cluster 100 balances the load of TCP or UDP traffic. However, end-users do not care about availability at the protocol layer. Rather, end-users care about application-layer availability. A user (such as one on clients 132-138) sends a request for information at the IP address of the cluster 100 via the Internet 120. For an NLB cluster, all hosts receive this request and based on previous "convergence" criteria of the cluster, one host responds. Load is balanced statistically by subdividing the IP: port space of clients among the nodes. In the aggregate, this achieves a balanced load.

Load-balancing clusters provide seamless fault-tolerance in the case of server or network failures. Load-balancing cluster nodes have several specific cluster-states. For example, in NLB, those states are:

Suspended—the node is not active in the cluster. It cannot be made active without an explicit "resume" request. Resume places the node in the Stopped state.

Stopped—the node is not active in the cluster.

Converging—the node is currently becoming active in the cluster. More precisely, all nodes (even those already active) move to this state any time the membership of the cluster changes.

Draining—the node is not receiving new load (e.g., user requests), but existing connections are allowed to complete.

Converged—the node is active in the cluster.

More generally, load-balancing cluster nodes have these activity-related cluster-states:

Active—the node is active when it is fully participating member of the cluster upon restart of the node. For example in NLB, the desired state upon restart of the node is "converged."

Inactive—the node is inactive when it is not a participating member of the cluster upon restart of the node. For example in NLB, the desired state upon restart of the node is "Stopped." Other examples of the inactive state include when a node is stopped or draining.

Those of ordinary skill in the art understand and appreciate the conventional structure and function of a load-balancing cluster like that illustrated in FIG. 1.

Local and Remote Application-Layer Availability Monitoring

Application-layer refers to the well-known OSI model. Since the application layer is the top layer, any delays at the lower layers ripple up to the application level. In addition, any errors at the lower levels impact the application layer adversely. Thus, monitoring at the application layer gives the true picture of node availability.

Herein, the focus is upon application-layer monitoring as opposed to other kinds of monitoring. An example of application-layer monitoring is performing an http GET for a Web server. An example of another type of monitoring include: checking whether Microsoft® Internet Information Server (IIS) is running as a service under Microsoft® Windows NT®; and collecting performance monitor (perfmon) counters for IIS. To the end-user, application-layer monitoring is superior for determining the actual availability of the service to an end-user.

There are two main ways to monitor application-layer availability of the nodes in a cluster: locally and remotely. Local application-layer monitoring is done from within the cluster. It is performed by the node manager and/or the nodes themselves. For example, if node manager 110 monitored the availability of the nodes 112a-f, then this is local monitoring. This type of monitoring may be called "endocluster" application-layer monitoring.

Remote application-layer monitoring is done from outside the cluster. It is not performed by the node manager and/or the nodes themselves. Rather, it is performed by a computer outside of the cluster, but coupled to the cluster via a network connection. For example, if client 132 monitored the availability of the nodes 112a-f, then this is remote monitoring. This type of monitoring may be called "exocluster" application-layer monitoring. Exocluster application-layer monitoring provides a more accurate measurement of the actual availability of the nodes in the cluster than local monitoring. Why? The ultimate measure of the availability of a node is how it appears to a client from outside the cluster, such as client 132. Therefore, exocluster application-layer monitoring is better because it views node availability from the client's perspective. Herein, this form of monitoring may also be called "client-perspective" application-layer monitoring.

Local application-layer monitoring is not sufficient because the systems are monitoring themselves from their own point of view. The monitoring does not follow the full path through all of the layers of the OSI model to get to the top layer—the application layer. Herein, this form of monitoring (i.e., local application-level) may also be called "cluster-perspective" application-layer monitoring.

Those of ordinary skill in the art are familiar with local and remote monitoring of node availability at the application-layer and are familiar with the advantages and disadvantages of both. Examples of conventional remote application-layer monitoring products include SiteScope® by Freshwater Software®.

Limitations of Conventional Exocluster Application-Layer Monitors

Passive Monitors. Conventional exocluster application-layer monitors are purely passive monitors. They are unable to actively control the nodes that they are monitoring. They cannot stop a problem node. Moreover, they are unable to start an inactive node once its problems have been resolved.

Protocol Specific. Conventional exocluster application-layer monitors are protocol specific. They monitor defined protocols (such as HTTP and SMTP) and are incapable of monitoring other protocols without being reprogrammed.

Static Cluster Membership. Conventional exocluster application-layer monitors monitor a static set of hosts; there is no notion of a cluster. That is, they are not cluster-aware. They are not dynamic. In other words, they cannot dynamically monitor all of the members of the cluster as members are added and removed. They can monitor new members (or stop monitoring old members) once the membership is statically defined specifically for the monitor. However, the conventional exocluster application-layer monitors cannot dynamically begin monitoring new members as they are added to the cluster or dynamically stop monitoring old members as they are removed.

SUMMARY

Described herein is a technology for remotely and dynamically monitoring the availability of the members of a load-balancing cluster. The technology provides a dynamic, exocluster application-layer monitor for dynamically monitoring and/or dynamically controlling the members of a load-balancing cluster.

The exocluster application-layer monitor is an active monitor—a controller. It may actively control the members that it monitors. The exocluster application-layer monitor is protocol agnostic. The exocluster application-layer monitor can dynamically adjust so that it can monitor all of the members of the cluster as members are added and removed.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth specific embodiments of a dynamic monitor and controller of availability of a load-balancing cluster that incorporates elements recited in the appended claims. These embodiments are described with specificity in order to meet statutory written description, enablement, and best-mode requirements. However, the description itself is not intended to limit the scope of this patent.

Described herein are one or more exemplary implementations of a dynamic monitor and controller of availability of a load-balancing cluster. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a dynamic monitor and controller of availability of a load-balancing cluster may be referred to as an "exemplary monitor/controller."

Introduction

Figure 4:
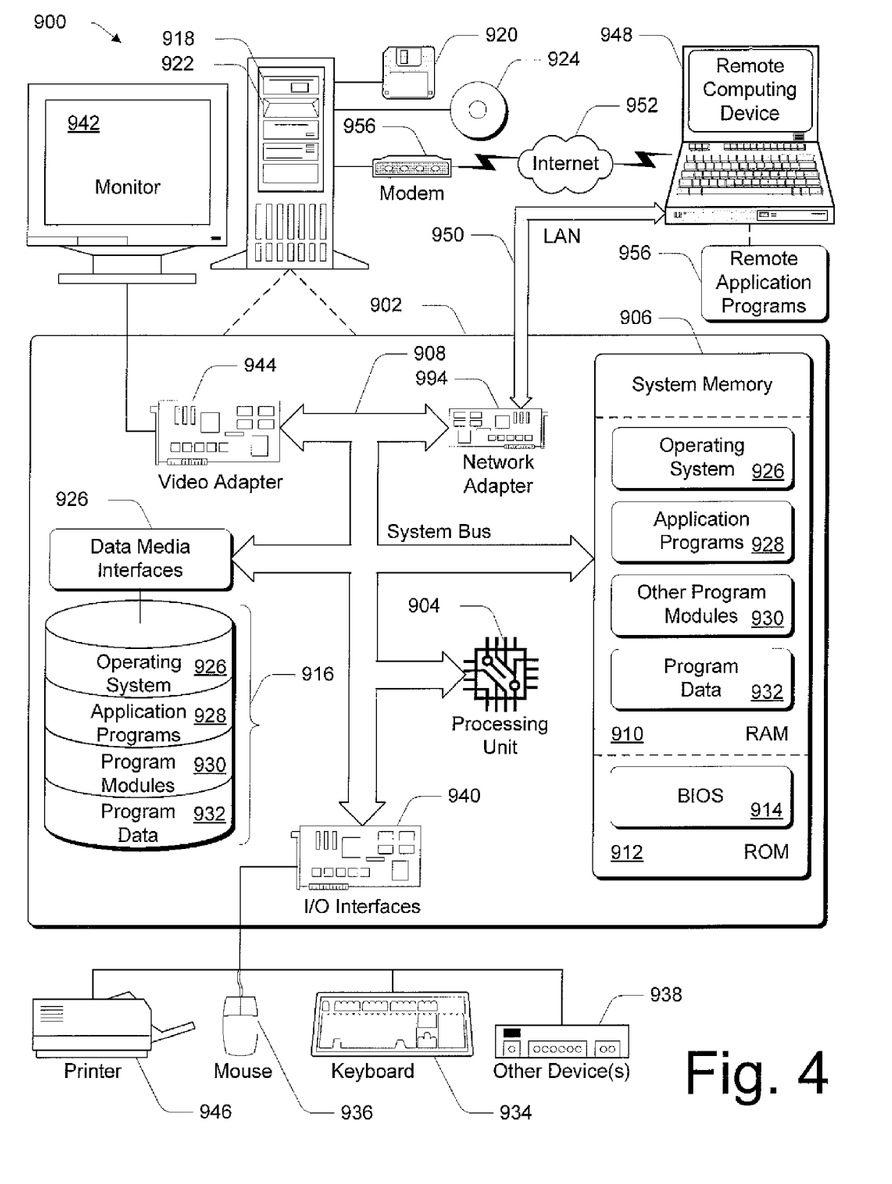
FIG. 4 is an example of a computing operating environment capable of implementing an implementation (wholly or partially) of the invention claimed herein.

The one or more exemplary implementations, described herein, of the present claimed invention may be implemented (in whole or in part) by an exocluster application-layer monitoring/controlling system 205 and/or by a computing environment like that shown in FIG. 4. More specifically, it may be implemented as a program module on a "client" computer, such as client 134 of FIG. 1.

Particularly when a business' Web site is their store front, they want to keep their doors open to all customers all of the time. Therefore, the Web site of such a business must be up 24/7/365 (i.e., every minute of the year) and usage delays must be minimized. Hosting the Web site on a load-balancing cluster goes a long way to achieving the goal, but some users may experience delays when a cluster member becomes overloaded or overwhelmed. To improve the overall availability of members (i.e., nodes) of a load-balancing cluster, node availability monitoring is desirable.

More than that, it is desirable to have the ability to automatically take corrective actions when application-layer monitoring indicates an error condition has occurred on one or more nodes. These types of application failures can be masked through manual intervention by issuing a command to remove the failing server from cluster participation, a process which takes seconds to complete (assuming that the load-balancing cluster allows such action). However, with conventional monitoring systems, the cluster is left exposed to faults occurring at the port and application level when manual intervention isn't forthcoming. With the exemplary monitor/controller, these fault conditions can be detected and automatically remedied, without user intervention.

Although the exemplary monitor/controller is remote from the load-balancing cluster (i.e., "exocluster"), it integrates with the cluster for cluster-state monitoring and control. It tracks changes in cluster membership and the cluster-state of the members. With control, the exemplary monitor/controller can use application-level monitoring results to decide when to add and remove servers from active cluster participation. By committing this information to a persistent store, the information needed to track the server's availability is accumulated over time.

Exemplary monitor/controller is a general-purpose monitoring and control system, which tests a node (of a cluster) at the application layer in order to determine whether the node is available. Exemplary monitor/controller may support any kind of testing as long as it can be captured as an app-monitor.

The exemplary monitor/controller tracks historical service availability. The information tracked helps answer many questions for the system administrator. Examples of such questions include:

How many errors have the servers had today? What kinds of errors are occurring?

What is the application-level availability of the site over the last two weeks?

When should the capacity of the site be increased?

Some Terminology

SIP—Single IP technology. A node manager has a single IP (SIP) for the entire cluster, or the nodes of a fully distributed cluster share the SIP. Thus, it uses SIP technology. Generally used in reference to either the technology or an API to programmatically connect to the technology.

Cluster—A collection of servers collectively acting as a single unit with a Single IP technology. In other words, a group of independent computer systems, referred to as nodes, working together as a unified computing resource.

VIP—Virtual IP address. The IP address assigned to the SIP technology that is put into DNS.

Load balancing—A technique for scaling the performance of a server-based application (such as a Web server) by distributing its client requests across multiple nodes within the cluster. Distributing processing and communications activity evenly across a computer network so that no single device is overwhelmed. Load balancing is especially important for networks where it's difficult to predict the number of requests that will be issued to a server. Busy Web sites typically employ two or more Web servers in a load-balancing scheme. If one server starts becomes overloaded, requests are forwarded to another server with more capacity.

Query—A command verb instructing the SIP technology to return the cluster state of one or more cluster members. No changes to state are made as a result of this command.

Drain—A command verb instructing the SIP technology to prevent new connections to the specified server or cluster, while allowing existing connections to "bleed" off. In other words, a state in which a node is no longer accepting incoming traffic is draining. No new connections are allowed, but existing connections are allowed to complete their jobs and terminate naturally.

Start—A command verb instructing the SIP technology to put a server or cluster into an active state so that it accepts load on behalf of the cluster.

Stop—A command verb instructing the SIP technology to put a server or cluster into an inactive state so that it no longer accepts load on behalf of the cluster. The accompanying state change does not guarantee completion of open connections.

Watermark—Percentage of the cluster that must remain active even if the servers are failing application-layer testing. For example, to maintain two servers in a three-server cluster the watermark should any value between 34% and 66%. The exemplary monitor/controller does not add a failing server in order to meet the cluster watermark, because the watermark is only used to determine if a failing server can be removed. Furthermore, suspended servers count against the number of servers that can be removed.

Exemplary Monitor/Controller

FIG. 1 illustrates an example of a load-balancing cluster 100 and clients (such as 132-138) accessing such cluster via the Internet 120 (or any network for that matter). The exemplary monitor/controller may be implemented in this environment. More specifically, the exemplary monitor/controller may be implemented at an apparent client workstation (such as 132-138). Since the exemplary monitor/controller is remote from the cluster that it monitors, it may be any client external from the cluster. It may be located physically adjacent the cluster or it may be located on the other side of the globe.

For illustration purposes, client 132 is designated "monitor workstation" 132 and it implements the exemplary monitor/controller. Since an implementation of the exemplary monitor/controller is modular, the functions (i.e., components) of the exemplary monitor/controller may be spread across multiple computers. Therefore, the monitor workstation 132 may represent multiple computers that are communicatively linked. In addition, the monitor workstation may monitor and/or control any node 112*a-f* of the cluster 100. Furthermore, the monitor workstation may monitor and/or control multiple clusters.

Exemplary Monitor/Controller Architecture

Figure 2:
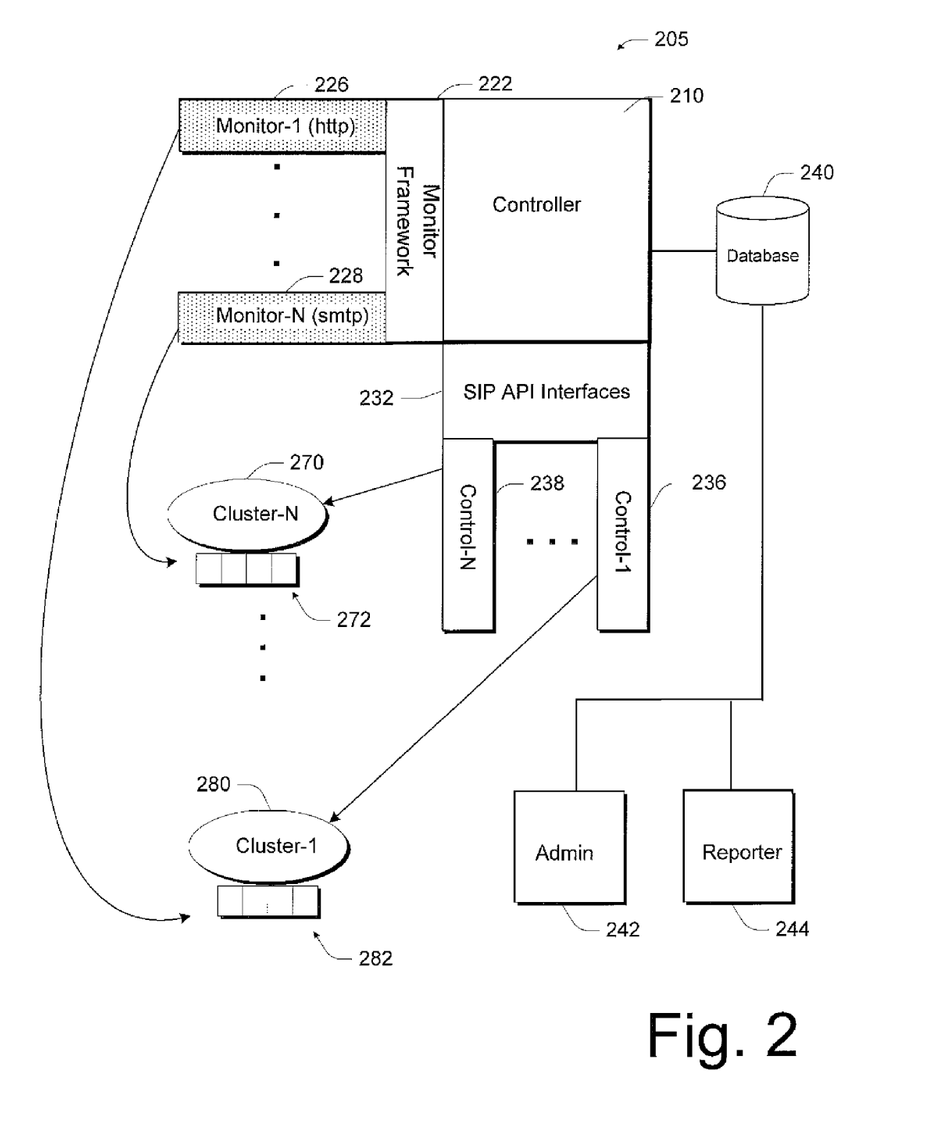
FIG. 2 is a schematic block diagram showing an embodiment of the invention claimed herein.

FIG. 2 illustrates an architecture of the exemplary monitor/controller. Primarily, it includes components 210-244 within the monitor workstation 132. FIG. 2 also includes exemplary clusters 270 and 280 to illustrate the focus of the monitoring and control of the exemplary monitor/controller.

The exemplary monitor/controller is built as a set of cooperating components, resulting in an architecture that is open and flexible. FIG. 2 illustrates the high-level components of the system as well as the way they interact. The components are an admin station 242, reporter station 244, database 240, and control system 205.

The admin station 242 is a user-interface component that operators use to interact with the rest of the system. In the exemplary monitor/controller, all communication from the admin station 242 proceeds through the database 240. There is no direct communication between the admin station 242 and the control system 205.

In the exemplary monitor/controller, the reporter 244 is a set of account-protected Web pages from which current status and availability information can be obtained. The Web pages of the reporter can be accessed directly through a browser or through a redirect in the admin station 242.

The database 240 is the central storage unit of the exemplary monitor/controller. An example of such a database is an SQL database like that provided by Microsoft® SQL Server®. The database serves at least three purposes:

Configuration Storage—all information needed to monitor clusters and their nodes is stored here.

State information repository—as state changes occur (e.g., a node that fails, then passes testing), information is stored in the database to record what happened and when. This provides the current status of the servers and is also used for availability analysis.

Communication link—one can control the operation and behavior of the control system 205 by issuing actions from the admin station 242. Actions are communicated to the control system 205 through the database which give it a specific task to perform (e.g., shut itself down or reload its configuration information).

Control System

As shown in FIG. 2, the control system 205 includes several components: Controller 210; monitor framework 222; app-monitors (such as 226 and 228); SIP API interfaces 232, and cluster-controls (such as 236 and 238).

As its name implies, the controller 210 is the central component of the control system 205. Examples of some the tasks it performs includes coordinating information about servers from the application layer and their state in a SIP cluster; determining whether a node should participate in cluster activity; and retrieving information from and writing information to the database.

The monitor framework 222 is a module for managing the app-monitors and other monitoring components. It assists the controller 210 in its duties. It is an insulator that hides the complexities of assessing service health.

The app-monitors (such as 226 and 228) plug into the monitor framework 222—one app-monitor for each supported protocol. Examples of such protocols include HTTP, SMTP, OCBC SQL, etc. These app-monitors actually perform the monitoring of nodes of clusters. For example, as illustrated in FIG. 2, monitor-1 226 monitors the nodes 282 of cluster-1 280 using the HTTP protocol. In another example, monitor-N 228 monitors the nodes 272 of cluster-N 270 using the SMTP protocol.

The SIP API interface 232 is a set of application programming interfaces (APIs) that are designed to facilitate cluster communication. It encapsulates all interactions with SIP technologies and is used to control and query for the status of cluster members.

The cluster-controls (such as 236 and 238) plug into the SIP APIs 232—one cluster-control for each supported clustering technology. These cluster-controllers actually perform the controlling and querying of nodes of clusters. For example, control-1 236 monitors cluster state and controls cluster participation of the nodes 282 in cluster-1 280. In addition, cluster-1 280 is monitored (both the cluster and the nodes 282) at the application-layer by monitor-1. In another example, control-N monitors cluster state and controls cluster participation of the nodes 272 in cluster-N 270. Monitor-N 228 monitors the application-layer state of cluster-N 270 and its nodes 272. With the framework 222 and SIP APIs 232, the controller 210 need not know about the protocols or tests involved to assess health. As new monitoring components come along, they snap into the control system transparently. In addition, the controller 210 can make health determinations by combining the test results from more than one monitor.

The control system 205 is where the results of application-layer monitoring are reconciled with the current state of the nodes in the cluster. Control of cluster state is performed, removing servers failing application-layer monitoring and adding servers passing application-layer monitoring.

The lifetime of a control system is managed by a service of the operating system of the monitor workstation 132. The service retrieves the list of needed control systems from the database 240, then instantiates each system in its own process. The control system 205 then reads its profile from the database and begins monitoring.

A control system profile consists of all information needed for it to monitor and control a set of clusters. This includes cluster properties (e.g., IP address) and the tests that monitor application-layer health. Note that the service can host one or more control systems, a control system can monitor and control many clusters, and a cluster can have many tests performed on its servers.

Methodological Implementation of the Exemplary Monitor/Controller

Figure 3:
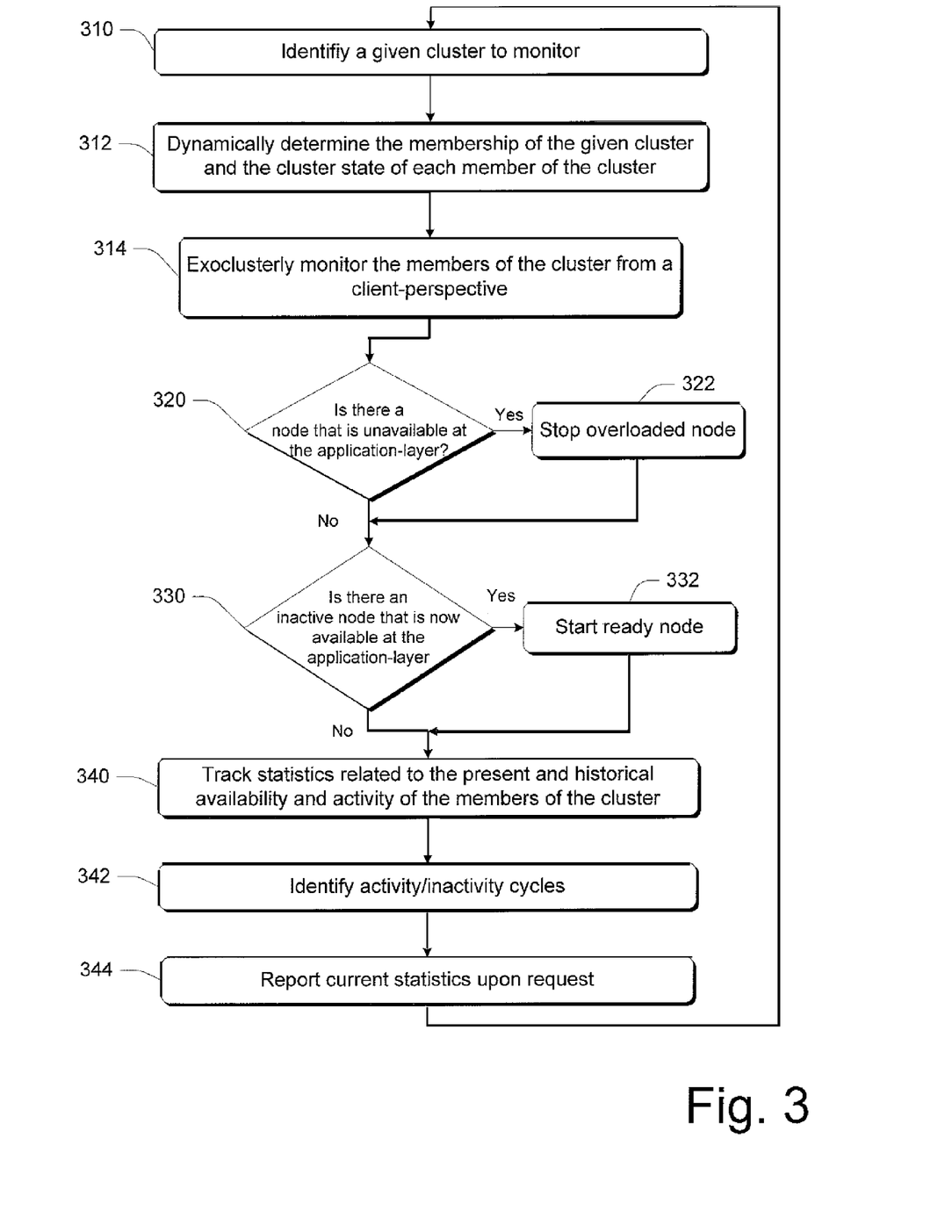
FIG. 3 is a flow diagram showing a methodological implementation of the invention claimed herein.

FIG. 3 shows a methodological implementation of the exemplary monitor/controller performed by the exocluster application-layer monitoring/controlling system 205 (or some portion thereof). This methodological implementation may be performed in software, hardware, or a combination thereof.

At 310 of FIG. 3, the exemplary monitor/controller is instructed to monitor a given cluster. At 312, it dynamically determines the membership of the given cluster and the cluster state of each member of the cluster. It may do so via a "query" command.

At 314, it exoclusterly monitors the members of the cluster from a client-perspective. In particular, it monitors the members of the cluster at the application-layer.

Such monitoring is achieved by testing the application layer. There are zero or more tests to assess application-layer health. A test may include the following properties:

ID—A unique identifier for the test assigned by the database.

Name—A friendly name to identify the test.

Description—Friendly text describing the test.

Test String—The information a monitor sends to test the server (e.g., /default.htm for a web server).

Type—A code used by the monitor to tell it what to do with the test string (e.g., Get Data for performing an HTTP GET against a web server).

Port#—The server-side port to receive the test string.

Timeout—The number of milliseconds to wait for the test to complete before aborting and declaring the test failed.

Retries—The number of additional consecutive, failed attempts the monitor will make before declaring an error.

Interval—How often (milliseconds) the test should be performed.

Monitor—A code to identify the type of monitor.

Authentication Username and Password—Optional fields used if the test requires authentication.

Authentication Type—the type of authentication to be used for the testing. Examples are anonymous (no authentication), clear text and NTLM.

In addition to testing for a response from a node as an indication of application-layer availability status (i.e., application-layer state), the exemplary monitor/controller may test in other ways.

One way is by simply examining a code returned by the node. This code is the result of a node's self-assessment of its availability. This code is typically tucked away in header information, but it may be in the body also.

Another way is to perform customized tests. In this way, the exemplary monitor/controller passes customized parameters to the node with the expectation of receiving known correct results (or a range of results) from the node. The node passes the test if the results returned are correct. For example, assume that a node hosts a search engine. It is known that given particular search terms that the node should return a given number (or specific type) of results.

At 320, the exemplary monitor/controller determines whether a member of the cluster is unavailable at the application-layer. If a node is overwhelmed, the exemplary monitor/controller sends a signal to stop that node at 322. Alternatively, it may signal that the overwhelmed node be placed into the "drain" state—which is a graceful way to "empty the check-out line". It may also alert the operator that the node needs servicing.

At 330 of FIG. 3, the exemplary monitor/controller determines whether a presently inactive member of the cluster is now available at the application-layer. Such a member may be inactive because it was stopped or drained earlier when it was overloaded. If an inactive node is otherwise ready for additional load, the exemplary monitor/controller sends a signal to start that node at 332.

At 340, the exemplary monitor/controller tracks statistics related to the present and historical availability and activity of the members of the cluster. It stores these statistics into a database (such as database 240). These statistics may be viewed by a reporter station (such as reporter 244).

At 342 of FIG. 3, the exemplary monitor/controller identifies activity/inactivity cycles. In such a cycle, a node is regularly swamped after being activated. Thus, this node is caught in a vicious cycle of activation, overload, inactivation, activation, overload, inactivation, and so forth. Using the recorded tracking statistics of recent history, the exemplary monitor/controller identifies this vicious cycle and attempts to stop it. It may wait an additional length of time before reactivating. It may take the member permanently offline and alert the operator that the node needs servicing. Step 332 (where an available node is started) may skip nodes that are identified as being part of a vicious cycle. At 344, the exemplary monitor/controller reports current statistics upon request. Likewise, it reports historical statistics upon request.

The process repeats as long as the members of one or more clusters are being monitored and controlled. Some steps may be performed concurrently.

More on the Exemplary Monitor/Controller

Active Monitoring. Unlike conventional exocluster application-layer monitors (which are purely passive monitors), the exemplary monitor/controller controls the members of the cluster as well as monitors them. They can stop a problem node. Moreover, they can start an inactive node once its problems have been resolved.

Protocol Agnostic. Unlike conventional exocluster application-layer monitors, the exemplary monitor/controller is not limited to a specific protocol. It can monitor any protocols without being reprogrammed. Examples of such protocols include HTTP, Chat, SMTP, SQL, and a generic TCP port-connect monitor for protocols not currently supported.

Dynamic Adjustment to Cluster Membership. Unlike conventional exocluster application-layer monitors that monitor only a static set of members of a cluster, the exemplary monitor/controller can monitor and control the entire membership of a cluster as that membership dynamically changes. In other words, it discovers and begins monitoring members as they are added to the cluster and stops the monitoring as they are removed from the cluster.

Tracking Historical Availability and Activity States. Unlike conventional exocluster application-layer monitors, the exemplary monitor/controller tracks and stores historical data regarding the application-layer test results and changes in the cluster state of the cluster nodes. Analysis of this data can be made to determine application-layer availability (known as an availability analysis) and determine the significance of each failure type (known as a failure analysis).

This data can also be used to locate and highlight common errors. This may be generally called "trending." These trends may be reported for manual or automated analysis. Analyzing trends in this way provides a mechanism to prevent similar errors occurring in similar cluster configurations.

Other Additional Details

There is a "one to many" relationship between the controller 210 and an application-layer app-monitor (such as app-monitors 226 and 228). For an app-monitor instance, there is exactly one controller instance to which it is responsible. On the other hand, a controller can coordinate the information from more than one app-monitor in order to determine node health. There may be multiple controllers running at the same time.

With the exemplary monitor/controller, the control system 205 runs under a service of the operating system. The service will point to a database (such as database 240) from which it obtains a configuration file for a controller. The controller (such as controller 210) loads its configurations from the database on startup in order to initialize itself. Alongside other information are the types of app-monitors that are configured for the controller to do its job. It will use this information in order to initialize the app-monitors of the system. This configuration will provide the controller 210 with all of the information it needs to start up. Examples of configuration information are: the protocol to use for application-layer monitoring, how to assess health using the application-layer protocol, test interval, timeout period for testing, the IP addresses of the cluster, its clustering technology, the number of hosts expected for each cluster, whether they are to be controlled or just monitored, and customer/owner contact information by cluster.

On startup, the controller 210 requests an interface to a set of app-monitors via framework 222. Information in the database identifies the clusters to be monitored by the controller, which avoids the same cluster from being controlled by more than one controller. The controller 210 can control/monitor an arbitrary number of clusters with arbitrary cluster size. Some clusters can be placed in "read-only" mode, in which the state is monitored, but not modified. In addition, non-Single IP technology servers can be monitored for availability measurements.

The controller 210 periodically checks the membership of the cluster and the cluster-state of the members. This is the common loop run through for the controller 210. The application-layer state is checked from the app-monitors for the cluster IP address and the node addresses. Any needed cluster-state changes are made to put in healthy servers and remove sick ones. The controller 210 persists both cluster-state and application-layer state changes over time so that a person can look for trends indicative of problems not evident from a single snapshot of the status.

Information from poll results and cluster membership is stored for offline viewing, but in an efficient manner such that only changes in state are persisted. Server and cluster status (this includes monitor information about the servers, cluster state information, and cluster availability estimates) is logged to the database 240, typically as the data is produced.

The controller 210 learns cluster membership and the cluster-state of each server directly from the cluster. This discovery is part of the normal loop for the controller 210, in which the cluster is queried for all of the members and their cluster-state. On each pass (including startup), this step is used to determine the list of servers that the app-monitors should track. The controller 210 only updates this list to the app-monitors when the list changes. When a node is no longer part of the cluster, the monitoring continues for a configurable amount of time, to give the host a chance to return (maybe it is being rebooted). If it doesn't the host is removed from monitoring at the application-layer.

The controller 210 passes a list of IP addresses (including a VIP) for the app-monitor to track. The controller 210 then periodically requests the status of the monitored addresses in the form of state changes. The application-layer monitor returns only what has changed since the last time the controller polled for the status. An application-layer state change consists of information such as IP address tested, protocol independent label of the test performed, protocol-dependent and protocol-independent status codes, time stamp of the state change and protocol-dependent information returned as a string (e.g., a "HTTP 200" result description).

If a healthy host is in the stopped state, the controller 210 will start it, if the controller is configured to control the state of this cluster's hosts. If a sick server is in the converged state, the controller 210 may drain, wait, and then stop. However, if removing the server will drop the number of servers below the "watermark", the server is not removed. Watermarks are set through the configuration on a cluster-by-cluster basis as a fraction of the expected cluster size. The drain portion can be bypassed (e.g., if the wait time is set to zero in the configuration for the cluster).

If a server is in an admin "Suspended" state, the controller 210 monitors it, but does not control it.

The controller 210 detects when it is in a vicious cycle between activating and deactivating a node. State is maintained in the controller 210 for each cluster in order to catch problems visible only by tracking state changes over time. For example, if a server is oscillating in and out of service (or in and out of the cluster), the controller 210 discovers this as an error condition.

Exemplary Computing System and Environment

FIG. 4 illustrates an example of a suitable computing environment 900 within which an exemplary monitor/controller, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary monitor/controller may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary monitor/controller may be described in the general context of computer-executable instructions, such as program modules, being executed by a computer. Generally, program modules include routines, programs, objects, components, data structures, etc. that perform particular tasks or implement particular abstract data types. The exemplary monitor/controller may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 4 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a dynamic cluster-membership determiner, an exocluster application-layer monitor, an exocluster controller, an overload-identifier, a state-determiner, a database, an app-monitor, cluster-control, and a central controller.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary monitor/controller may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 900 in which an exemplary monitor/controller may be implemented. Specifically, the exemplary monitor/controller(s) described herein may be implemented (wholly or in part) by any program modules 928-930 and/or operating system 928 in FIG. 4 or a portion thereof.

The operating environment is only an example of a suitable operating environment and is not intended to suggest any limitation as to the scope or use of functionality of the exemplary monitor/controller(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary monitor/controller may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method performed by a control client that communicates with a load-balancing cluster of server nodes configured to service application-layer requests sent by user clients to a virtual address common to the cluster, the method comprising:

dynamically determining, by the control client, which server nodes are members of the load-balancing cluster;

monitoring application-layer availability of the server nodes in the load-balancing cluster, the monitoring being performed by the control client generating and sending, from outside of the load-balancing cluster application-layer, requests to those server nodes determined to be members of the load-balancing cluster; and in accordance with the application-layer availability of a server node in the load-balancing cluster as determined by the application-layer monitoring of the control client, sending to the load-balancing cluster a message that is configured to control whether the server node handles application-layer requests sent to the load-balancing cluster by the user clients, where the application-layer requests sent by the control client to monitor application-layer availability conform to a same application-layer protocol that the user client requests conform to.

2. A method as recited in claim 1 further comprising exoclusterly and selectively deactivating one or more active members of the cluster.

3. A method as recited in claim 1 further comprising, based upon the monitoring, identifying one or more active members of the cluster that are presently overwhelmed at the application-layer.

4. A method as recited in claim 1 further comprising:

based upon the monitoring, identifying one or more active members of the cluster that are presently overwhelmed at the application-layer;

exoclusterly deactivating one or more members identified by the identifying.

5. A method as recited in claim 1 further comprising exoclusterly and selectively activating one or more inactive members of the cluster.

6. A method as recited in claim 1 further comprising, based upon the monitoring, identifying one or more inactive members of the cluster that are not presently overwhelmed at the application-layer.

7. A method as recited in claim 1 further comprising:

based upon the monitoring, identifying one or more inactive members of the cluster that are not presently overwhelmed at the application-layer;

exoclusterly activating one or more members identified by the identifying.

8. A method as recited in claim 1 further comprising:

based upon the monitoring, identifying one or more active members of the cluster that are presently overwhelmed at the application-layer and identifying one or more inactive members of the cluster that are not presently overwhelmed at the application-layer;

exoclusterly deactivating one or more active members identified by the identifying;

exoclusterly activating one or more inactive members identified by the identifying.

9. A method as recited in claim 1 further comprising determining a present activity state of members of the cluster.

10. A method as recited in claim 1 further comprising:

determining a present activity state of members of the cluster;

tracking and persisting the activity states of the members of the cluster.

11. A method as recited in claim 10, wherein the activity states include cluster states.

12. A method as recited in claim 10 further comprising reporting a present activity state of one or more members of the cluster.

13. A method as recited in claim 10 further comprising reporting historical record of the activity states of one or more members of the cluster.

14. A method as recited in claim 10 further comprising reporting a present application-layer state of one or more members of the cluster.

15. A method as recited in claim 10 further comprising reporting historical record of the application-layer states of one or more members of the cluster.

16. A method as recited in claim 1, wherein the monitoring comprises monitoring in one or more different application-layer protocols.

17. A method as recited in claim 1, further comprises, based upon the monitoring, determining the application-layer availability of one or more members based upon an indicator of such availability, the indicator sent from a member being monitored.

18. A method as recited in claim 1, further comprises:
based upon the monitoring, determining the application-layer availability of one or more members based upon a indicator of such availability, the indicator sent from a member being monitored;
the member being monitored determining such availability and generating such indicator.

19. A computer-readable storage medium having computer-executable instructions that, when executed by a computer, perform the method as recited in claim 1.

20. A method performed by a control client that communicates with a load-balancing cluster of server nodes configured to service application-layer requests sent by user clients to a virtual address common to the cluster, the method comprising:
monitoring application-layer availability of the server nodes in the load-balancing cluster, the monitoring being performed by the control client generating and sending, from outside of the load-balancing cluster application-layer, requests to those server nodes determined to be members of the load-balancing cluster; and
in accordance with the application-layer availability of a server node in the load-balancing cluster as determined by the application-layer monitoring of the control client, sending to the load-balancing cluster a message that is configured to control whether the server node handles application-layer requests sent to the load-balancing cluster by the user clients, where the application-layer requests sent by the control client to monitor application-layer availability conform to a same application-layer protocol that the user client requests conform to.

21. A method as recited in claim 20, wherein the monitoring comprises selectively deactivating one or more active members of the cluster.

22. A method as recited in claim 20, wherein the monitoring comprises, based upon the monitoring, identifying one or more active members of the cluster that are presently overwhelmed at the application-layer.

23. A method as recited in claim 20, wherein the monitoring comprises:
based upon the monitoring, identifying one or more active members of the cluster that are presently overwhelmed at the application-layer;
exoclusterly deactivating one or more members identified by the identifying.

24. A method as recited in claim 20, wherein the monitoring comprises selectively activating one or more inactive members of the load-balancing cluster.

25. A method as recited in claim 20, wherein the monitoring comprises, based upon the monitoring, identifying one or more inactive members of the cluster that are not presently overwhelmed at the application-layer.

26. A method as recited in claim 20, wherein the monitoring comprises:
based upon the monitoring, identifying one or more inactive members of the cluster that are not presently overwhelmed at the application-layer;
exoclusterly activating one or more members identified by the identifying.

27. A method as recited in claim 20, wherein the monitoring comprises:
based upon the monitoring, identifying one or more active members of the cluster that are presently overwhelmed at the application-layer and identifying one or more inactive members of the cluster that are not presently overwhelmed at the application-layer;
exoclusterly deactivating one or more active members identified by the identifying;
exoclusterly activating one or more inactive members identified by the identifying.

28. A method as recited in claim 20 further comprising determining a present activity state of the members of the cluster.

29. A method as recited in claim 20 further comprising:
determining a present activity state of the members of the cluster;
tracking and persisting the activity states of the members of the cluster.

30. A method as recited in claim 29, wherein the activity state includes a cluster state.

31. A method as recited in claim 29 further comprising reporting a present activity state of one or more members of the cluster.

32. A method as recited in claim 29 further comprising reporting historical record of the activity states of one or more members of the cluster.

33. A method as recited in claim 29 further comprising reporting a present application-layer state of one or more members of the cluster.

34. A method as recited in claim 29 further comprising reporting historical record of the application-layer states of one or more members of the cluster.

35. A method as recited in claim 20, wherein the monitoring comprises monitoring in one or more different application-layer protocols.

36. A computer-readable storage medium having computer-executable instructions that, when executed by a computer, performs the method as recited in claim 20.

37. A computer-readable storage medium having computer-executable instructions that, when executed by a computer, perform a method performed by a control client that communicates with a load-balancing cluster of server nodes configured to service application-layer requests sent by user clients to a virtual address common to the cluster, the method comprising:
dynamically determining, by the control client, which server nodes are members of the load-balancing cluster;
monitoring application-layer availability of the server nodes in the load-balancing cluster, the monitoring being performed by the control client generating and sending, from outside of the load-balancing cluster application-layer, requests to those server nodes determined to be members of the load-balancing cluster; and
in accordance with the application-layer availability of a server node in the load-balancing cluster as determined by the application-layer monitoring of the control client, sending to the load-balancing cluster a message that is configured to control whether the server node handles application-layer requests sent to the load-balancing cluster by the user clients where the application-layer requests sent by the control client to monitor application-layer availability conform to a same application-layer protocol that the user client requests conform to.

38. A system comprising:
a control client that communicates with a load-balancing cluster of server nodes configured to service application-layer requests sent by user clients to a virtual address common to the cluster;
a dynamic cluster-membership determiner configured to exoclusterly and dynamically determine, by the control client, which server nodes are members of the load-balancing cluster;
an exocluster monitor configured to monitor application-layer availability of the server nodes in the load-balancing cluster, the monitoring being performed by the control client generating and sending, from outside of the load-balancing cluster application-layer, requests to those server nodes determined to be members of the load-balancing cluster; and
in accordance with the application-layer availability of a server node in the load-balancing cluster as determined by the application-layer monitoring of the control client sending to the load-balancing cluster a message that is configured to control whether the server node handles application-layer requests sent to the load-balancing cluster by the user clients where the application-layer requests sent by the control client to monitor application-layer availability conform to a same application-layer protocol that the user client requests conform to.

39. A system as recited in claim 38 further comprising an overload-identifier configured to identify, based upon the monitored availability, one or more active members of the cluster that are presently overwhelmed at the application-layer.

40. A system as recited in claim 38 further comprising an overload-identifier configured to identify, based upon the monitored availability, one or more inactive members of the cluster that are not presently overwhelmed at the application-layer.

41. A system as recited in claim 38 further comprising a state-determiner configured to determine a present activity state of members of the cluster.

42. A system as recited in claim 38 further comprising:
a state-determiner configured to determine a present activity state of members of the cluster;
a database configured to store the activity states of the members of the cluster.

43. A system as recited in claim 38, wherein the exocluster monitor is protocol agnostic.

44. A system comprising:
a control client that communicates with a load-balancing cluster of server nodes configured to service application-layer requests sent by user clients to a virtual address common to the cluster;
an exocluster monitor configured to monitor application-layer availability of the server nodes in the load-balancing cluster, the monitoring being performed by the control client generating and sending, from outside of the load-balancing cluster application-layer, requests to those server nodes determined to be members of the load-balancing cluster; and
in accordance with the application-layer availability of a server node in the load-balancing cluster as determined by the application-layer monitoring of the control client sending to the load-balancing cluster a message that is configured to control whether the server node handles application-layer requests sent to the load-balancing cluster by the user clients, where the application-layer requests sent by the control client to monitor application-layer availability conform to a same application-layer protocol that the user client requests conform to.

45. A system as recited in claim 44, wherein the exocluster monitor is further configured to exoclusterly and selectively deactivate one or more active members of the cluster.

46. A system as recited in claim 44 further comprising an overload-identifier configured to identify, based upon the monitored availability, one or more active members of the cluster that are presently overwhelmed at the application-layer.

47. A system as recited in claim 44, wherein the exocluster monitor is further configured to exoclusterly and selectively activate one or more inactive members of the cluster.

48. A system as recited in claim 44 further comprising an overload-identifier configured to identify, based upon the monitored availability, one or more inactive members of the cluster that are not presently overwhelmed at the application-layer.

49. A system as recited in claim 44 further comprising a state-determiner configured to determine a present activity state of the members of the cluster.

50. A system as recited in claim 44 further comprising:
a state-determiner configured to determine a present activity state of the members of the cluster;
a database configured to store the activity states of the members of the cluster.

51. A system as recited in claim 44, wherein the monitor is protocol agnostic.

52. A dynamic, active, exocluster monitoring system for monitoring application-layer availability of server nodes in a load-balancing cluster and for controlling an activity state of such server nodes, the monitoring system comprising:
a control client that communicates with a load-balancing cluster of server nodes configured to service application-layer requests sent by user clients to a virtual address common to the cluster;
an app-monitor configured to exoclusterly monitor application-layer availability of the server nodes in the load-balancing cluster the, monitoring being performed by the control client generating and sending, from outside of the load-balancing cluster application-layer, requests to those server nodes determined to be members of the load-balancing cluster; and
in accordance with the application-layer availability of a server node in the load-balancing cluster as determined by the application-layer monitoring of the control client, sending to the load-balancing cluster a message that is configured to control whether the server node handles application-layer requests sent to the load-balancing cluster by the user clients, where the application-layer requests sent by the control client to monitor application-layer availability conform to a same application-layer protocol that the user client requests conform to.

53. A system as recited in claim 52 further comprising a database configured to store state change information, including cluster state and application-layer state.

54. A system as recited in claim 52 further comprising multiple app-monitors.

55. A system as recited in claim 52 further comprising multiple cluster-controls.

* * * * *